US010774601B2

(12) United States Patent
Søyland

(10) Patent No.: US 10,774,601 B2
(45) Date of Patent: Sep. 15, 2020

(54) GRIPPER DEVICE FOR GRIPPING A PIPE

(71) Applicant: Nabors Lux 2 SARL, Luxembourg (LU)

(72) Inventor: Svein Søyland, Kvernaland (NO)

(73) Assignee: NABORS LUX 2 SARL, Luxembourg (LU)

(*) Notice: Subject to any disclaimer, the term of this patent is extended or adjusted under 35 U.S.C. 154(b) by 0 days.

(21) Appl. No.: 16/318,479

(22) PCT Filed: Jul. 5, 2017

(86) PCT No.: PCT/NO2017/050180
§ 371 (c)(1),
(2) Date: Jan. 17, 2019

(87) PCT Pub. No.: WO2018/016964
PCT Pub. Date: Jan. 25, 2018

(65) Prior Publication Data
US 2019/0284886 A1    Sep. 19, 2019

(30) Foreign Application Priority Data
Jul. 22, 2016  (NO) .................................. 20161219

(51) Int. Cl.
*E21B 19/16* (2006.01)
*F16B 2/10* (2006.01)
(Continued)

(52) U.S. Cl.
CPC .............. *E21B 19/168* (2013.01); *F16B 2/10* (2013.01); *F16B 2/185* (2013.01); *F16H 19/001* (2013.01);
(Continued)

(58) Field of Classification Search
CPC ........ E21B 19/161; E21B 19/168; F16B 2/10; F16B 2/185; F16H 19/001; F16H 21/44; F16H 57/082
See application file for complete search history.

(56) References Cited

U.S. PATENT DOCUMENTS

| 4,463,635 A  * | 8/1984 | Hafla ....................... B23Q 1/76 |
| | | 294/116 |
| 8,419,097 B2 * | 4/2013 | Lunde ..................... E21B 19/14 |
| | | 294/115 |
| 10,370,913 B2 * | 8/2019 | Soyland ................ E21B 19/161 |

FOREIGN PATENT DOCUMENTS

| GB | 2089708 | 6/1982 |
| WO | 2011021943 | 2/2011 |
| WO | 2016089216 | 6/2016 |

OTHER PUBLICATIONS

Search Report for Norwegian Application No. 20161219 dated Feb. 28, 2017 (2 pages).

(Continued)

*Primary Examiner* — Matthew R Buck
(74) *Attorney, Agent, or Firm* — Abel Schillinger, LLP; Enrique Abarca

(57) ABSTRACT

A pipe gripping device includes a gripper arm arrangement having first and second gripper arms and having an open state which enables the pipe to be introduced into an opening between the arms, and an engaged state in which the gripper arms are adapted to engage with the pipe. First and second drive arms movably connect the respective first gripper arm and the second gripper arm to a support structure. Pivots rotationally connect the drive arms to the support structure. The device further comprises a transmission drive shaft and a transmission arrangement having first, second and third transmission members, each rotatable in respect to each other and coupled with each other. The first member is (Continued)

coupled with the drive shaft, the second member is coupled to the first member and the first drive arm, and the third member is coupled with the second member and the second drive arm.

31 Claims, 6 Drawing Sheets

(51) Int. Cl.
    *F16B 2/18*           (2006.01)
    *F16H 19/00*         (2006.01)
    *F16H 21/44*         (2006.01)
    *F16H 57/08*         (2006.01)

(52) U.S. Cl.
    CPC ........... *F16H 21/44* (2013.01); *F16H 57/082* (2013.01); *F16H 2019/008* (2013.01)

(56) References Cited

OTHER PUBLICATIONS

PCT Search Report for PCT/N02017/050180 dated Sep. 12, 2017 (2 pages).
PCT Written Opinion for PCT/N02017/050180 dated Sep. 12, 2017 (4 pages).

\* cited by examiner

GRIPPER DEVICE FOR GRIPPING A PIPE

This application is a 35 U.S.C. § 371 national stage application of PCT/NO2017/050180 filed Jul. 5, 2017 and entitled "A Gripper Device for Gripping a Pipe", which claims priority to Norwegian Patent Application No. 20161219 filed Jul. 22, 2016, each of which is incorporated herein by reference in their entirety for all purposes.

STATEMENT REGARDING FEDERALLY SPONSORED RESEARCH OR DEVELOPMENT

Not applicable.

INTRODUCTION

The present disclosure relates to a gripper device for gripping a pipe, typically pipes used in the petroleum industry. More particularly the disclosure relates to a gripper adapted to grip and securely hold pipes of different diameters.

BACKGROUND

Prior art gripper devices for gripping pipes are used for handling pipes and similar objects in an automated manner. The conventional such gripper device may, for example, be arranged on a robot arm that is used for reorienting the pipe from a horizontal position to a vertical position. In regards to the petroleum industry, the pipes are, for example, drilling pipes, where a plurality of drilling pipes are to be connected with each other for the drilling operation. During such operation, pipes of different diameters are to be firmly gripped, reoriented and securely connected with each other.

A problem with prior art gripper devices for such operation is that they are extensive in size. In the petroleum industry, and in particularly offshore operations, the available space on a drilling rig is limited. Yet, to be able to selectively pick pipes from a storage rack, the pipes must be sufficiently spaced apart for the gripper device.

A further problem with prior art gripper devices is to enable pipes with different diameters and having irregularities, such as various degree of ovality, to be securely gripped with substantially the same contact pressure on both gripping arms and while allowing the pipes to be rotated around their longitudinal axes.

WO 2011/021943 discloses a gripper adapted for gripping petroleum pipes of different diameters. The gripper comprises two gripper arms movably supported in a gripper housing. The gripper arms are connected to the housing via a pair of pivotal link arms and a pair of pivotal drive arms. The drive arms are actively driven by means of a pair of rotatable shafts supported in the gripper housing. The geometry of the gripper arms and the link and drive arms, and in particular, the different lengths of the link and drive arms, enables the gripper to grip pipes within a range of different diameters. However, the arrangement of the two rotatable drive shafts spaced apart from each other prevents a compact design of the gripper.

U.S. Pat. No. 4,858,979 discloses a gripper device comprising two harmonic drive transmissions arranged spaced apart in series on a drive shaft. While the gripper device employs a single drive shaft, the two transmissions spaced apart from each other are likewise preventing a compact design of the gripper device.

BRIEF SUMMARY OF THE PRESENT DISCLOSURE

Disclosed herein is a compact gripper device as is desirable in order to enable the pipes to be picked from a storage rack that stores the pipes in as compact manner as possible. The device comprises a support structure, a gripper arm arrangement comprising a first gripper arm and a second gripper arm comprising an open state which enables the pipe to be introduced into an opening between the gripper arms and an engaged state in which end portions of the gripper arms are adapted to engage with the pipe, a drive arm arrangement comprising a first drive arm and a second drive arm movably connecting the respective first gripper arm and the second gripper arm to the support structure, and a pivot arrangement comprising a first pivot and a second pivot rotationally connecting the respective first drive arm and the second drive arm to the support structure. The device further comprises a drive mechanism comprising a transmission drive shaft and a transmission arrangement comprising a first, second and third transmission member.

The apparatus disclosed herein aims to reduce at least one of the drawbacks of the prior art, or at least provide a useful alternative to prior art. A first object of the disclosure is to provide a more compact gripper device with maintained performance compared with prior art gripper devices. A second object of the disclosure is to provide a gripper device that enables pipes of different diameters to be gripped in a more reliable manner. A third object of the disclosure is to provide a gripper device that enables pipes with imperfection in roundness (i.e. having various degrees of ovality) to be firmly gripped and simultaneously rotated around their longitudinal axes.

These objects are achieved by means of a gripper device for gripping a pipe according to claim 1. The gripper device comprises:

a support structure, a gripper arm arrangement comprising a first gripper arm and a second gripper arm comprising an open state which enables the pipe to be introduced into an opening be-tween the gripper arms and an engaged state in which end portions of the gripper arms are adapted to engage with the pipe, a drive arm arrangement comprising a first drive arm and a second drive arm movably connecting the respective first gripper arm and the second gripper arm to the support structure, a pivot arrangement comprising a first pivot and a second pivot rotationally connecting the respective first drive arm and the second drive arm to the support structure, and a drive mechanism comprising a transmission drive shaft and a transmission arrangement comprising a first, second and third transmission member.

In the gripper device thus described, the first transmission member, the second transmission member and the third transmission member are each rotatable in respect to each other and coupled directly or indirectly with each other, wherein the first transmission member is coupled with the drive shaft, the second transmission member is coupled to the first transmission member, and the third transmission member is coupled with the second transmission member, wherein the second transmission member is coupled to the first drive arm and the third transmission member is coupled to the second drive arm.

The gripper device thus described enables a single drive shaft to be used while providing a compact design by means of the transmission arrangement being provided with the three transmission members that each are rotatable in respect to each other. By configuring the transmission arrangement so that:

the first transmission member is coupled with the drive shaft, the second transmission member is coupled to the first transmission member and with the first drive arm, the third transmission member is coupled with the second transmission member and with the second drive arm, a single transmission can be used for rotating the first and the second gripper arm on basis of a single drive shaft.

Accordingly, the gripper device of this disclosure enables a compact design compared to prior art devices. Furthermore, the transmission arrangement results in that the contact pressure towards the pipe is balanced between the first and the second gripper arm. Accordingly, by means of the balance in contact pressure, the gripper device of of this disclosure enables pipes of different diameters to be gripped in a more reliable manner compared with prior art gripper devices.

The term "coupled" is relating to a connection between two parts directly or indirectly that enables mechanical power to be transmitted between the parts. The transmission of mechanical power may be direct, i.e. a transmission ratio of 1:1, or may comprise a gear transmission providing a mechanical advantage, i.e. a transmission ratio other than 1:1. Accordingly, the transmission drive shaft transmits power to the first transmission member. The first transmission member transmits power to the second transmission member that transmits the power to the first drive arm. The first transmission member further transmits power to the third transmission member that transmits the power to the second drive arm.

According to an embodiment of the disclosure, the first, second and third transmission member of the transmission arrangement are coaxially arranged. The coaxially arrangement of the three transmission members in respect to each other result in a compact design of the transmission arrangement and accordingly the gripper device.

According to an embodiment of the disclosure, the second transmission member and the third transmission member are configured rotatable in opposite directions in respect to each other.

According to an embodiment of the disclosure, the device further comprises:

a further gripper arm arrangement comprising a third gripper arm and a fourth gripper arm comprising an open state which enables the pipe to be introduced into an opening between the gripper arms and an engaged state in which end portions of the gripper arms are adapted to engage with the pipe, a further drive arm arrangement comprising a third drive arm and a fourth drive arm movably connecting the respective third gripper arm and the fourth gripper arm to the support structure, a further pivot arrangement comprising a third pivot and a fourth pivot rotationally connecting the respective third drive arm and the fourth drive arm to the support structure, and wherein the drive mechanism further comprises:

a further transmission arrangement comprising a further first transmission member, further second transmission member and further third transmission member, each rotatable in respect to each other and coupled directly or indirectly with each other, wherein the further first transmission member is coupled with the drive shaft, the further second transmission member is coupled to the further first transmission member, and the further third transmission member is coupled with the further second transmission member, wherein the further second transmission member is coupled to the fourth drive arm and the further third transmission member is coupled to the third drive arm.

The further gripper arm arrangement comprises a second set of gripper arms. The gripper arm arrangement and the further gripper arm arrangement provide a combined gripping of the pipe, where the gripper arms of the gripper arm arrangement are gripping the pipe at a first position along the length of the pipe and the gripper arms of the further gripper arm arrangement are gripping the pipe at a second position along the length of the pipe. Accordingly, by means of the gripper arm arrangement and the further gripper arm the pipe is gripped in a firm and reliable manner.

The device is further arranged so that the drive mechanism comprises the further transmission arrangement for the further gripper arm arrangement that has a similar design to the transmission arrangement for the gripper arm arrangement. The further transmission arrangement comprises likewise the three further transmission members that are rotatable in respect to each other and coupled directly or indirectly with each other.

By also configuring the further transmission arrangement so that:

the further first transmission member is coupled with the drive shaft, the further second transmission member is coupled to the further first transmission member and with the fourth drive arm, the further third transmission member is coupled with the further second transmission member and with the third drive arm, a single transmission can be used for rotating the third and the fourth gripper arm on basis of a single drive shaft.

Accordingly, the arrangement with the transmission arrangement and further transmission arrangement coupled to the drive shaft provides a compact design of the disclosed gripper device. Furthermore, the disclosed gripper device provides an interconnection between the gripper arms of the two sets of gripper arms so that the contact pressure towards the pipe is balanced between the first and the second gripper arm, and between the third and fourth gripper arm. Accordingly, by means of the balance in contact pressure, the disclosed gripper device enables pipes of different diameters to be gripped in a more reliable manner at two positions along the length of the pipe.

According to an embodiment of the present disclosure, the further first, second and third transmission member of the further transmission arrangement are coaxially arranged. The coaxially arrangement of the three further transmission members in respect to each other result in a compact design of the further transmission arrangement and accordingly the gripper device.

According to an embodiment of the present disclosure, the further second transmission member and the further third transmission member are configured rotatable in opposite directions in respect to each other.

According to an embodiment of the present disclosure, the drive mechanism further comprises a first pinion and a second pinion, wherein the first pinion is coupled to the transmission drive shaft, the first transmission member and the second pinion, and wherein the second pinion is coupled to the further first transmission member. The first and second pinion are coupled so that power from the transmission drive shaft is distributed to both the transmission arrangement and the further transmission arrangement.

According to an embodiment of the present disclosure, the device comprises a respective connection element between the first gripper arm and the third gripper arm, and between the second gripper arm and the fourth gripper drive arm.

By means of the connection element the contact pressure at the contact of the first gripper arm with the pipe and the contact of the third gripper arm with the pipe is distributed between the first gripper arm and the third gripper arm. Correspondingly, the contact pressure is distributed between the second gripper arm and the fourth gripper arm.

According to an embodiment of the present disclosure, the transmission arrangement is any of a planetary gear, a harmonic gear, a cycloidal gear or a gear where the input shaft and the output shaft are located on a common rotational axis.

According to an embodiment of the present disclosure, the further transmission arrangement is any of a planetary gear, a harmonic gear, a cycloidal gear or a gear where the input shaft and the output shaft are located on a common rotational axis.

According to an embodiment of the present disclosure, the transmission arrangement comprises planetary gear, wherein the first transmission member constituting a sun gear, the second transmission member constituting two or more planetary gears, and the third transmission member constituting an annular gear.

According to an embodiment of the present disclosure, the further transmission arrangement comprises planetary gear, wherein the further first transmission member constituting a sun gear, the further second transmission member constituting two or more planetary gears, and the further third transmission member constituting an annular gear.

According to an embodiment of the present disclosure, the first pinion is directly engaging with the sun gear of the transmission member and the second pinion. By means of the direct engagement of the first pinion with the sun gear and the second pinion, the power from the transmission drive shaft is transmitted in a compact manner.

According to an embodiment of the present disclosure, the transmission arrangement comprises a first stage gearing and a second stage gearing. By means of two or more stages of gearing, a high gearing ratio can be obtained while maintaining a compact design of the gripper device.

According to an embodiment of the present disclosure, the further transmission arrangement comprises a first stage gearing and a second stage gearing.

According to an embodiment of the present disclosure, the first stage gearing comprises a first stage sun gear, a first stage planetary gears, a first stage annular gear, and wherein the second stage gearing comprises a second stage sun gear, a second stage planetary gears and second stage annular gear.

By means of the first stage gearing and the second stage gearing, the power from the transmission shaft is geared to desired gear ratio while maintaining the respective transmission arrangement and further transmission arrangement compact.

According to an embodiment of the present disclosure, the gripper device further comprises an adjustable synchronization gearing acting on the transmission arrangement and the further transmission arrangement. The synchronization gearing is synchronizing the power distribution from the transmission shaft to the transmission arrangement and the further transmission arrangement. Thereby, the movement of the first, second, third and fourth gripper arm will be synchronized.

According to an embodiment of the present disclosure, the synchronization gearing is acting on the third transmission member of the transmission arrangement and the further third transmission member of the further transmission arrangement.

According to an embodiment of the present disclosure, in regards to a planetary gearing, the synchronization gearing is acting on the annular gear of the transmission arrangement and the annular gear of the further transmission arrangement.

According to an embodiment of the present disclosure, the synchronization gearing comprises a synchronization carrier configured to allow movement of the synchronization carrier around a planet gear axis in dependency of a position of the gripper arms.

According to an embodiment of the present disclosure, the synchronization gearing comprises adjustment means for adjusting the allowed movement of the synchronization carrier.

According to an embodiment of the present disclosure, the support structure is extending into said opening between the gripper arms, and wherein the gripper device further comprises link arm arrangement comprising a first link arm and a second link arm arranged rotationally connected between the support structure and the respective first griping arm and second griping arm in said opening between the gripper arms.

The first link arm and the second link arm are adapted to support the rotation of the first and second gripper arm between the open state and the engaged state.

According to an embodiment of the present disclosure, the support structure is extending into said opening between the gripper arms, and wherein the gripper device further comprises a third link arm and a fourth first link arranged rotationally connected between the support structure and the respective third and fourth griping arm. The third link arm and the fourth link arm are adapted to support the rotation of the third and fourth gripping arm between the open state and the engaged state.

According to an embodiment of the present disclosure, the first link arm and the second link arm comprise a respective fifth pivot between the link arms and the support structure, and a respective sixth pivot between the first link arm and the first gripper arm and between the second link arm and the second gripper arm.

According to an embodiment of the present disclosure, the gripper device further comprises a further link arm arrangement comprising a further first link arm and a further second link arm arranged rotationally connected between the support structure and the respective third gripper arm and fourth gripper arm in said opening between the gripper arms.

The further first link arm and the further second link arm are adapted to support the rotation of the third and fourth gripper arm between the open state and the engaged state. The further link arm arrangement comprises pivots corresponding to the fifth pivot and sixth pivot of the link arm arrangement.

According to an embodiment of the present disclosure, the drive mechanism comprises a drive unit and a drive train for transmitting power to from drive unit to the transmission drive shaft.

According to an embodiment of the present disclosure, the drive unit is an electric motor. By means of an electric motor, the power can be transmitted in a more controlled manner compared to use of a hydraulic cylinder, a pneumatic cylinder as the drive unit.

According to an embodiment of the present disclosure, the support structure is extending into said opening between the gripper arms and wherein the support structure comprises an abutment element arranged in the opening between the gripper arms so that the pipe abuts with the abutment element when the gripper arms are in the engaged state.

By means of the abutment element, the pipe is supported in the engaged state in at least three points, that is at the end portion of the first gripper arm, at the end portion of the second gripper arm, and at the abutment element. The corresponding applies for the third and fourth gripper arm. Accordingly, by means of the abutment element, the gripper device of the present disclosure improves the reliability of griping pipes of different diameters.

According to an embodiment of the present disclosure, the device further comprises a rotation device adapted act on the pipe with a force that sets the pipe into rotation when the gripper arms are in the engaged state.

The rotation device is adapted to set the pipe in rotation in respect to the longitudinal axis of the pipe. By means of the interconnection between the first gripper arm and second gripper arm that provides a balancing in contact pressure between the end portions of the gripper arms and the pipe, pipes with ovality can be rotated in a more reliable manner compared with prior art gripper devices.

According to an embodiment of the present disclosure, the rotation device is arranged on the abutment element.

According to an embodiment of the present disclosure, the rotation device comprises one or more drive rollers adapted to contact the pipe when the gripper arms are in the engaged state. Preferably, the rotation device comprises two drive rollers arranged in vicinity to each other and positioned so that they contact the pipe when the gripper arms are in the engaged state.

According to an embodiment of the present disclosure, the gripper device comprises a further drive unit and a further drive transmission for transmitting power from the further drive unit to said one or more drive rollers.

According to an embodiment of the present disclosure, the gripper device comprises a further rotation device arranged at an end portion of at least one the gripper arms, preferably at end portions of both of gripper arms, for supporting the rotation of the pipe when the gripper arms are in the engaged state. The further rotation device supports the pipes when it is being rotated while being gripped by the first and the second gripper arms in the engaged state.

According to an embodiment of the present disclosure, the further rotation device comprises one or more passive rollers adapted to contact the pipe when the gripper arms are in the engaged state.

BRIEF DESCRIPTION OF DRAWINGS

In the following is described examples of preferred embodiments illustrated in the accompanying drawings, wherein.

DETAILED DESCRIPTION OF THE DISCLOSED EXEMPLARY EMBODIMENTS

Figure 1:
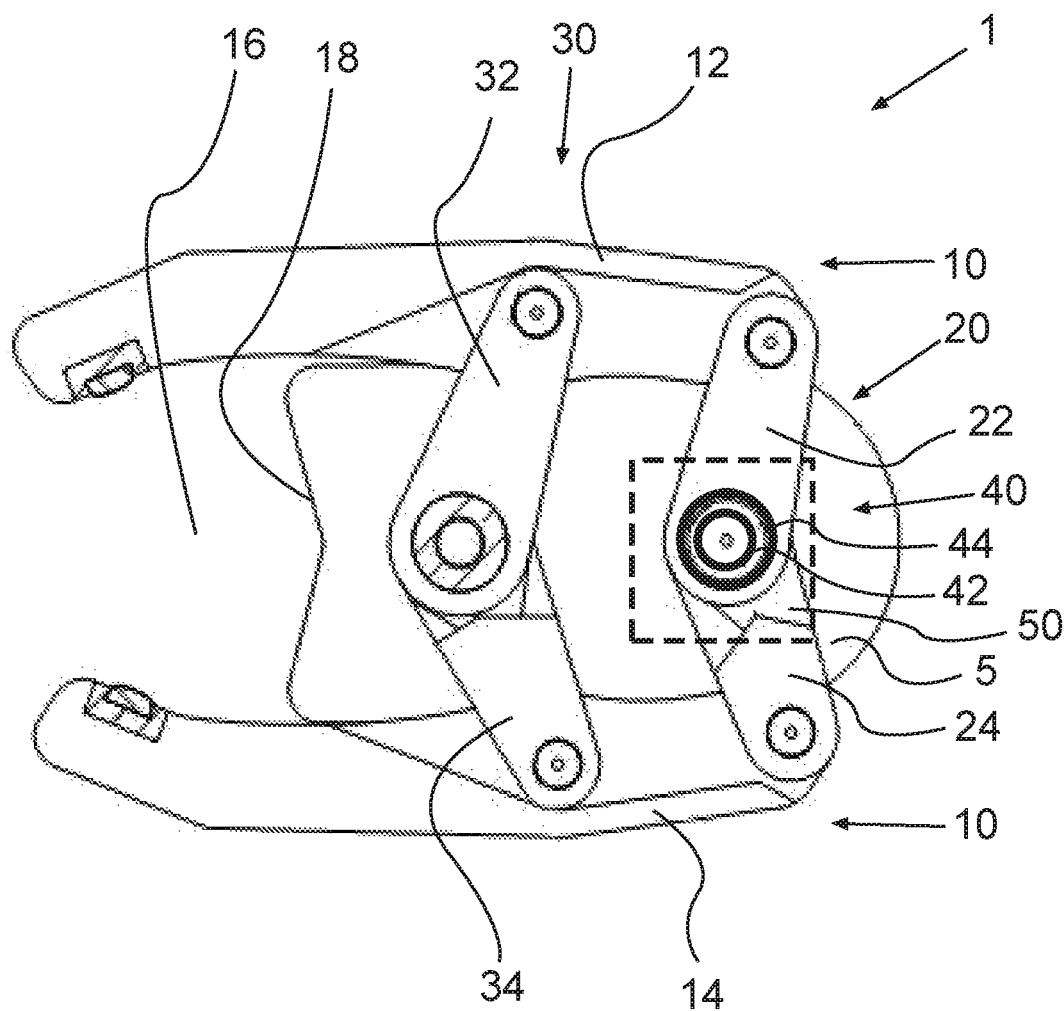
FIG. 1 discloses a top view a gripper device according to a first embodiment of the present disclosure.

In FIG. 1 a top view of a gripper device 1 according to a first embodiment of the present disclosure is disclosed. The gripper device 1 comprises a support structure 5 and a gripper arm arrangement 10 comprising a first gripper arm 12 and a second gripper arm 14. In FIG. 1, the gripper device 1 comprises a single set of first gripper arm 12 and a second gripper arm 14.

The first gripper arm 12 and the second gripper arm 14 comprise an open state where the gripper arms 12, 14 form an opening 16 for receiving a pipe, such as a drilling pipe. The first gripper arm 12 and the second gripper arm 14 further comprise an engaged state, where end portions of the gripper arms 12, 14 are adapted to engage with the pipe. In the disclosed embodiment, the support structure 5 is extending into the opening 16 between the gripper arms 12, 14 and the support structure 5 comprises an abutment element 18 arranged in the opening 16 between the gripper arms 12, 14 so that the pipe abuts with the abutment element 18 when the gripper arms 12, 14 are in the engaged state.

The gripper device 1 further comprises a drive arm arrangement 20 comprising a first drive arm 22 between the support structure 5 and the first gripper arm 12, and a second drive arm 24 between the support structure 5 and the second gripper arm 14. The first drive arm 22 and second drive arm 24 are movably connecting the respective first gripper arm 12 and the second gripper arm 14 to the support structure 5.

The gripper device 1 further comprises a link arm arrangement 30 comprising a first link 32 arm and a second link arm 34. The support structure 5 is extending into the opening 16 between the gripper arms 12, 14. The first link arm 32 and the second link arm 34 are arranged rotationally connected between the support structure 5 and the respective first griping arm 12 and second griping arm 14. The link arm arrangement 30 is adapted to support the rotation of the first griping arm 12 and second griping arm 14.

The gripper device 1 also comprises a pivot arrangement 40 for rotation of gripper arms 12, 14. The pivot arrangement 40 comprises a first pivot 42 and a second pivot 44 rotationally connecting the respective first drive arm 22 and the second drive arm 24 to the support structure 5, thereby enabling the first gripper arm 12 and the second gripper arm 14 to be rotated towards and away from each other. The first pivot 42 and the second pivot 44 are preferably concentrically arranged. In FIG. 1, the first pivot 42 is illustrated by an inner ring and the second pivot 44 is illustrated by an outer ring.

The gripper device 1 further comprises a drive mechanism 50 for rotating the gripper arms 12, 14. In FIG. 1, the drive mechanism 50 is illustrated by a doted square at the pivot arrangement 40.

Figure 2:
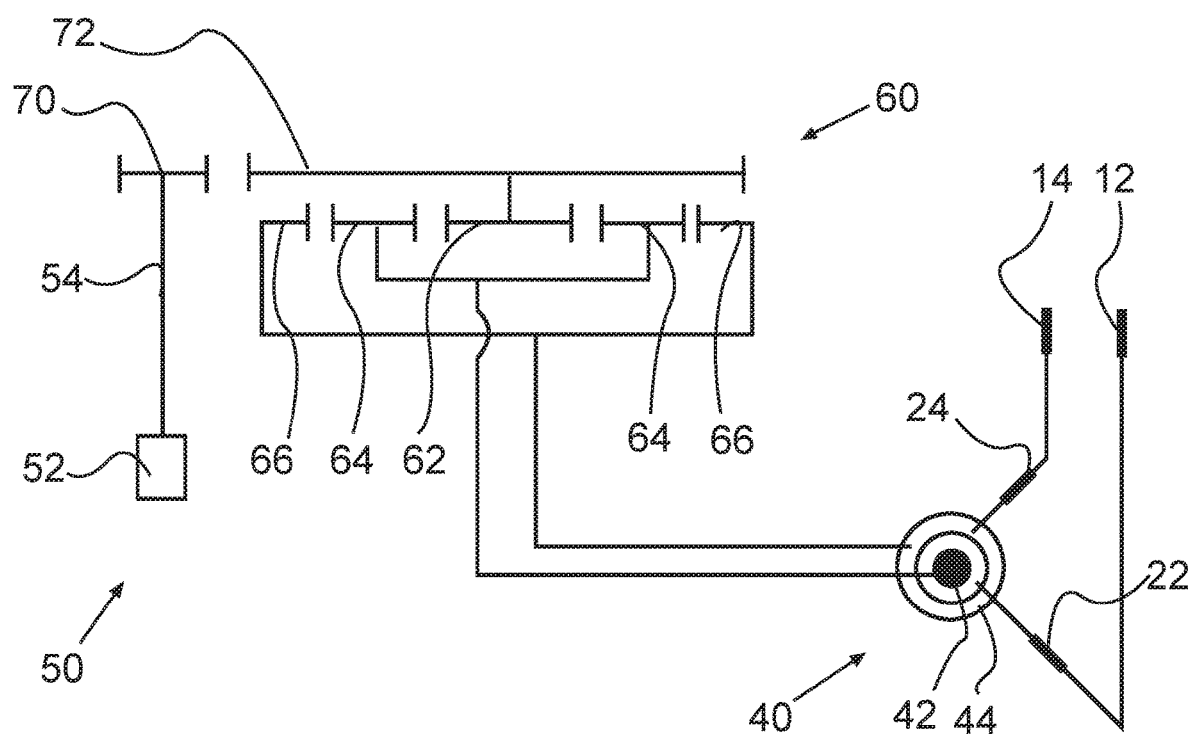
FIG. 2 discloses a schematic overview of a drive mechanism of the gripper device in FIG. 1, FIG. 3 discloses an exploded view of an example of an embodiment of the drive mechanism of the gripper device in FIG. 1.

FIG. 2 discloses a schematic overview of the drive mechanism 50 of the gripper device 1 in FIG. 1. The drive mechanism 50 comprises a drive unit 52, such as an electric motor, a transmission drive shaft 54 and a transmission arrangement 60.

The transmission arrangement 60 comprises a first transmission member 62, a second transmission member 64 and a third transmission member 66, each rotatable in respect to each other and coupled directly or indirectly with each other. The transmission arrangement 60 comprises, for example, a planetary gear, a harmonic gear, a cycloidal gear or a gear where the input shaft and the output shaft are located on a common rotational axis.

The transmission arrangement 60 is configured so that the first transmission member 62 is coupled with the drive shaft 54, the second transmission member 64 is coupled to the first transmission member 62, and the third transmission member 66 is coupled with the second transmission member 64. The second transmission member 64 is coupled to the first drive arm 22 and the third transmission member 66 is coupled to the second drive arm 24.

In FIG. 2, the first transmission member 62 is coupled to the drive shaft 54 by means of a first pinion 70 acting on a gear wheel 72 that is acting on the first transmission member 62 so that power from the drive shaft 54 is transmitted to the first transmission member 62. It shall be understood that the first transmission member 62 alternatively may engage directly with the transmission drive shaft 54.

In an embodiment of the present disclosure, the transmission arrangement 60 is a planetary gear, wherein the first transmission member 62 constituting a sun gear, the second transmission member 64 constituting two or more planetary gears, and the third transmission member 66 constituting an annular gear.

In an embodiment of the present disclosure, the transmission arrangement 60 is a harmonic gear, wherein the first transmission member 62 constituting a wave generator, the second transmission member 64 constituting flex spline, and the third transmission member 66 constituting an circular spline.

In an embodiment of the present disclosure, the transmission arrangement 60 is a cycloidal gear, wherein the first transmission member 62 constituting a input gear, such as comprising a crank shaft, the second transmission member 64 constituting an output shaft, such as connected to a cam follower, and the third transmission member 66 constituting a casing, such as a casing with one or more pins arrayed with a constant pitch.

By means of the described configuration of the transmission arrangement 60, a single transmission can be used for rotating the first gripper arm 12 and the second gripper arm 14 on basis of a single drive shaft. Thereby, a compact design of the drive mechanism 50 is provides, which enables a compact design of the gripper device 1 compared with prior art gripper devices.

Furthermore, the rotation of the first gripper arm 12 and second gripper arm 14 are interconnected by means of the transmission arrangement 60. Thereby, the contact pressure between end portions of the respective gripper arms 12, 14 and the pipe is balanced and the pipes can be gripped in a reliable manner. This is importance when gripping pipes of different diameters with irregularities, such as having certain degree of ovality. The balanced contact pressure is of particular importance when the gripper device 1 is to grip such an irregular pipe while simultaneously rotating the pipe along its longitudinal axis.

Figure 3:
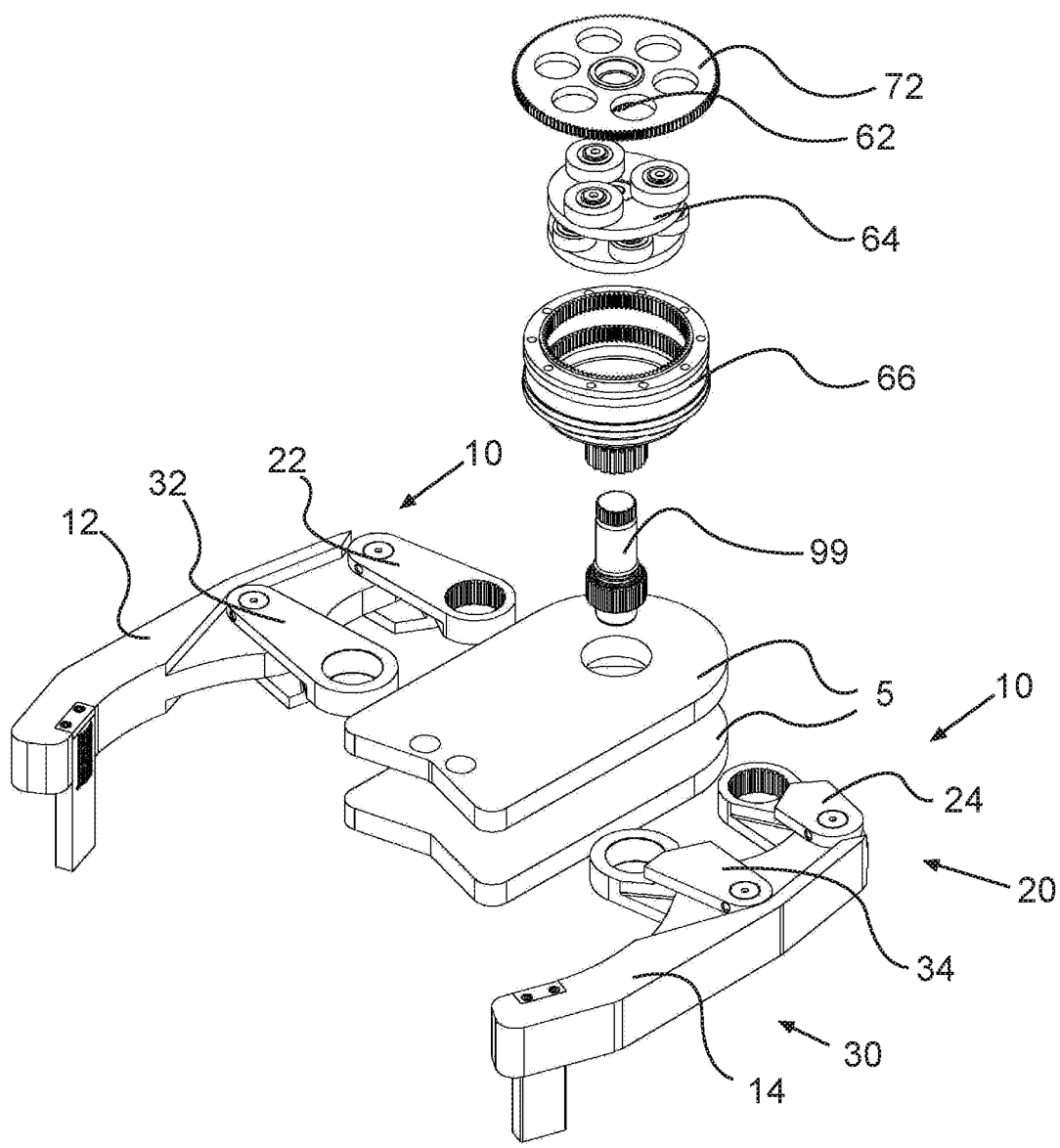

FIG. 3 discloses an exploded view of an example of an embodiment of the drive mechanism 50 of the gripper device 1 in FIG. 1. In FIG. 3, the transmission arrangement 60 comprises the above described planetary gear comprising a first stage planets and a second stage planets for providing a further mechanical advantage compared to a single stage planets. It shall be understood that a single stage planets or a plurality stage planets may be applied to the transmission arrangement 60. Furthermore, in FIG. 3, a planetary drive shaft 99 is seen. The planetary drive shaft 99 is an internal shaft of the planetary gear.

Figure 4:
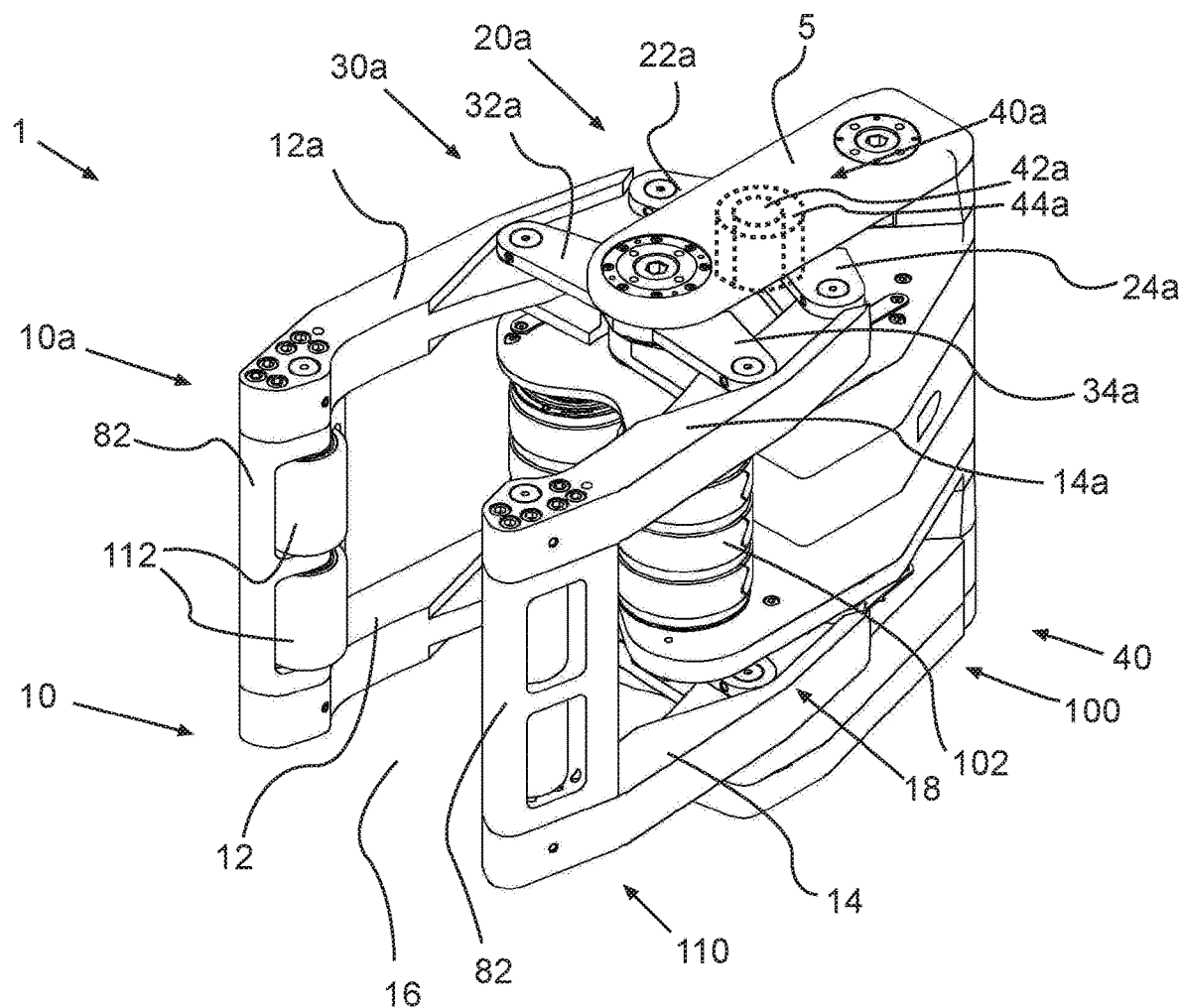
FIG. 4 discloses a perspective view of a gripper device according to a second embodiment of the present disclosure.

In FIG. 4 a perspective view of a gripper device 1 according to a second embodiment of the present disclosure is disclosed. The a gripper device 1 of the second embodiment differs in that the device also comprises a further gripper arm arrangement 10a, further drive arm arrangement 20a, a further link arm arrangement 30a and a further pivot arrangement 40a.

The gripper arm arrangement 10a comprises a third gripper arm 12a and a fourth gripper arm 14a comprising an open state which enables the pipe to be introduced into an opening 16 between the gripper arms 12a, 14a and an engaged state in which end portions of the gripper arms 12a, 14a are adapted to engage with the pipe.

The further drive arm arrangement 20a comprises correspondingly a third drive arm 22a and a fourth drive arm 24a movably connecting the respective third gripper arm 12a and the fourth gripper arm 14a to the support structure 5.

The further link arm arrangement 30a comprises a third link arm 32a and a fourth link arm 34a. The third link arm 32a and a fourth link arm 34a are arranged rotationally connected between the support structure 5 and the respective third griping arm 12a and fourth griping arm 14a. The further link arm arrangement 30a is adapted to support the rotation of the third griping arm 12a and fourth griping arm 14a between the open state and the engaged state.

The further pivot arrangement 40a comprising a third pivot 42a and a fourth pivot 44a rotationally connecting the respective third drive arm 22a and the fourth drive arm 24a to the support structure 5.

Figure 5:
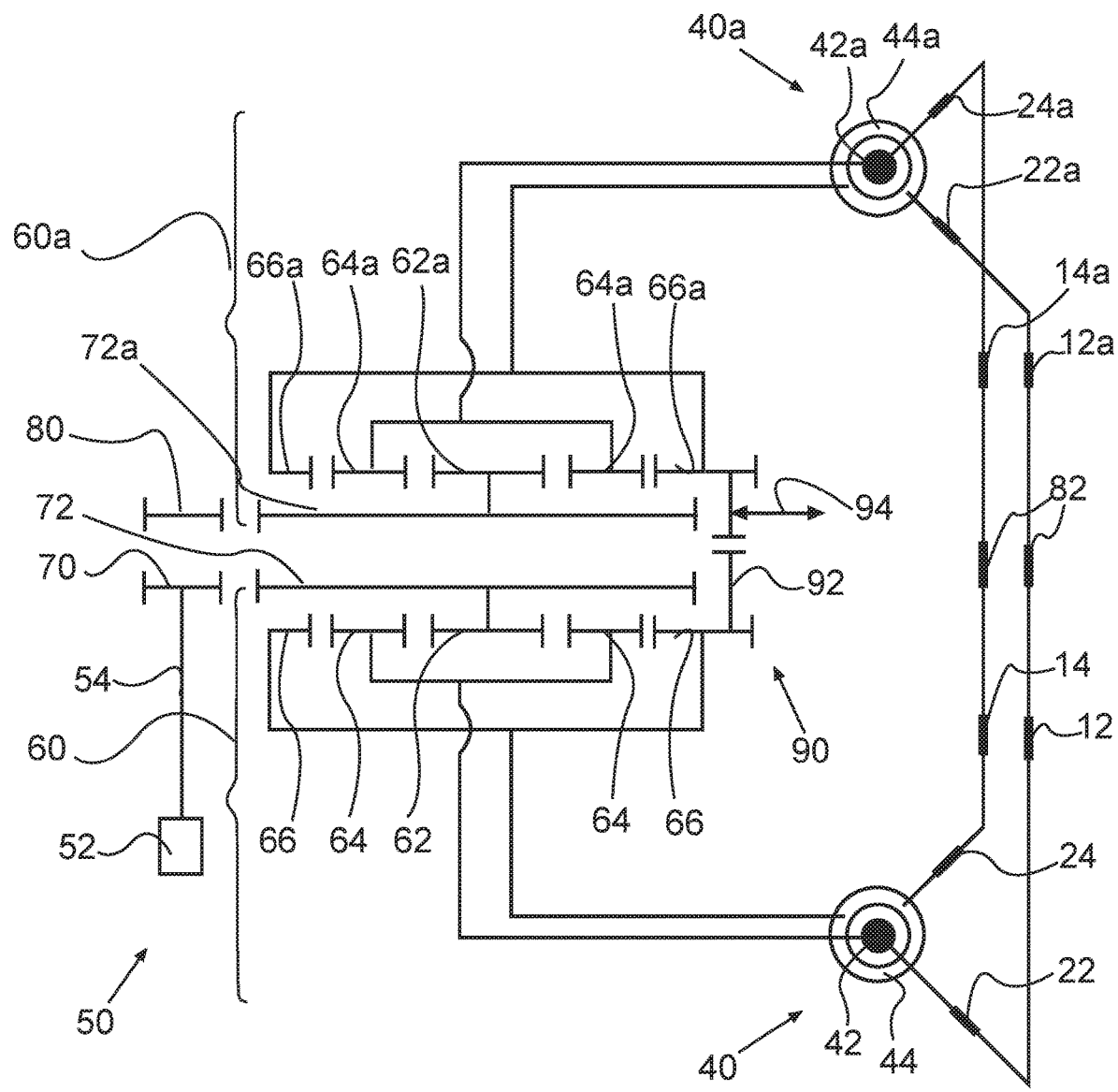
FIG. 5 discloses a schematic overview of a drive mechanism of the gripper device in FIG. 4.

With reference to FIG. 5, the gripper device in FIG. 4 furthermore differs in the configuration of the drive mechanism 50 by means of that the drive mechanism 50 comprises both the transmission arrangement 60 and a further transmission arrangement 60a.

The further transmission arrangement 60a is configured with a similar design to the transmission arrangement 60. The further transmission arrangement 60a comprises a further first transmission member 62a (which may also be referred to herein and in the claims as the fourth transmission member 64a), further second transmission member 64a (which may also be referred to herein and in the claims as the fifth transmission member 64a) and further third transmission member 66a (which may also be referred to herein and in the claims as the sixth transmission member 66a). Each transmission member 62a, 64a and 66a is rotatable in respect to each other and coupled directly or indirectly with each other.

The further transmission arrangement 60a is configured so that the further first transmission member 62a is coupled with the drive shaft 54. In the disclosed embodiment, the drive mechanism 50 comprises the first pinion 70 and a second pinion 80. The first pinion 70 is coupled to the transmission drive shaft 54, the first transmission member 62 and the second pinion 80. In the disclose embodiment, the power from the transmission shaft 54 is transmitted to the first transmission member 62 by means of the gear wheel 72 correspondingly to the configuration in FIG. 2. The second pinion 80 is coupled to the further first transmission member 62a. Correspondingly, in the disclosed embodiment, the power from the transmission shaft 54 is transmitted to the further first transmission member 62a through the second pinion 80 and a further gear wheel 72a.

The further second transmission member 64a is coupled to the further first transmission member 62a, and the further third transmission member 66a is coupled with the further second transmission member 64a. The further second transmission member 64a is coupled to the fourth drive arm 24a and the further third transmission member 66a is coupled to the third drive arm 22a.

Correspondingly to the transmission arrangement 60 in FIG. 2, the further transmission arrangement 60a comprises, for example, a planetary gear, a harmonic gear, a cycloidal gear or a gear where the input shaft and the output shaft are located on a common rotational axis.

The further transmission arrangement 60a for the further gripper arm arrangement 10a is configured with a similar design to the transmission arrangement 60 for the gripper arm arrangement 10. The further transmission arrangement 60a comprises likewise the three further transmission members 62a, 64a, 66a that are rotatable in respect to each other and coupled directly or indirectly with each other.

The gripper device 1 is configured so that the first drive arm 22 is parallel with the third drive arm 22a, and the second drive arm 24 is parallel with the fourth drive arm 24a. Furthermore, the gripper device 1 comprises a respective connection element 82 between the first gripper arm 12 and the third gripper arm 12a, and between the second gripper arm 14 and the fourth gripper drive arm 14a.

Accordingly, each of the first gripper arm 12, second gripper arm 14, third gripper arm 12a and fourth gripper arm 14a are individually powered by means of the transmission arrangement 60 and the further transmission arrangement 60a on basis of a power from a single transmission drive shaft 54. By means of the configuration of the transmission arrangement 60, the contact pressure between the end portions of the first gripper arm 12 and second gripper arm 14 to the pipe is balanced. Correspondingly, by means of the configuration of the further transmission arrangement 60a, the contact pressure between the end portions of the third gripper arm 12a and fourth gripper arm 14a to the pipe is balanced.

The drive mechanism 50 further differs from the drive mechanism in FIG. 1 by means of an adjustable synchronization gearing 90 acting on the transmission arrangement 60 and the further transmission arrangement 60a. The synchronization gearing 90 comprises a synchronization carrier 92. The synchronization gearing 90 is configured to allow movement of the synchronization carrier 92 around a planet gear axis in dependency of a position of the gripper arms 12, 14, 12a, 14a. Furthermore, the synchronization gearing 90 comprises adjustment means 94 for adjusting the allowed movement of the synchronization carrier 92. By means of the synchronization gearing 90, the rotations of the first gripper arm 12 and third gripper arm 12a are synchronized with the rotations of the second gripper arm 14 and the fourth gripper arm 14a.

Figure 6:
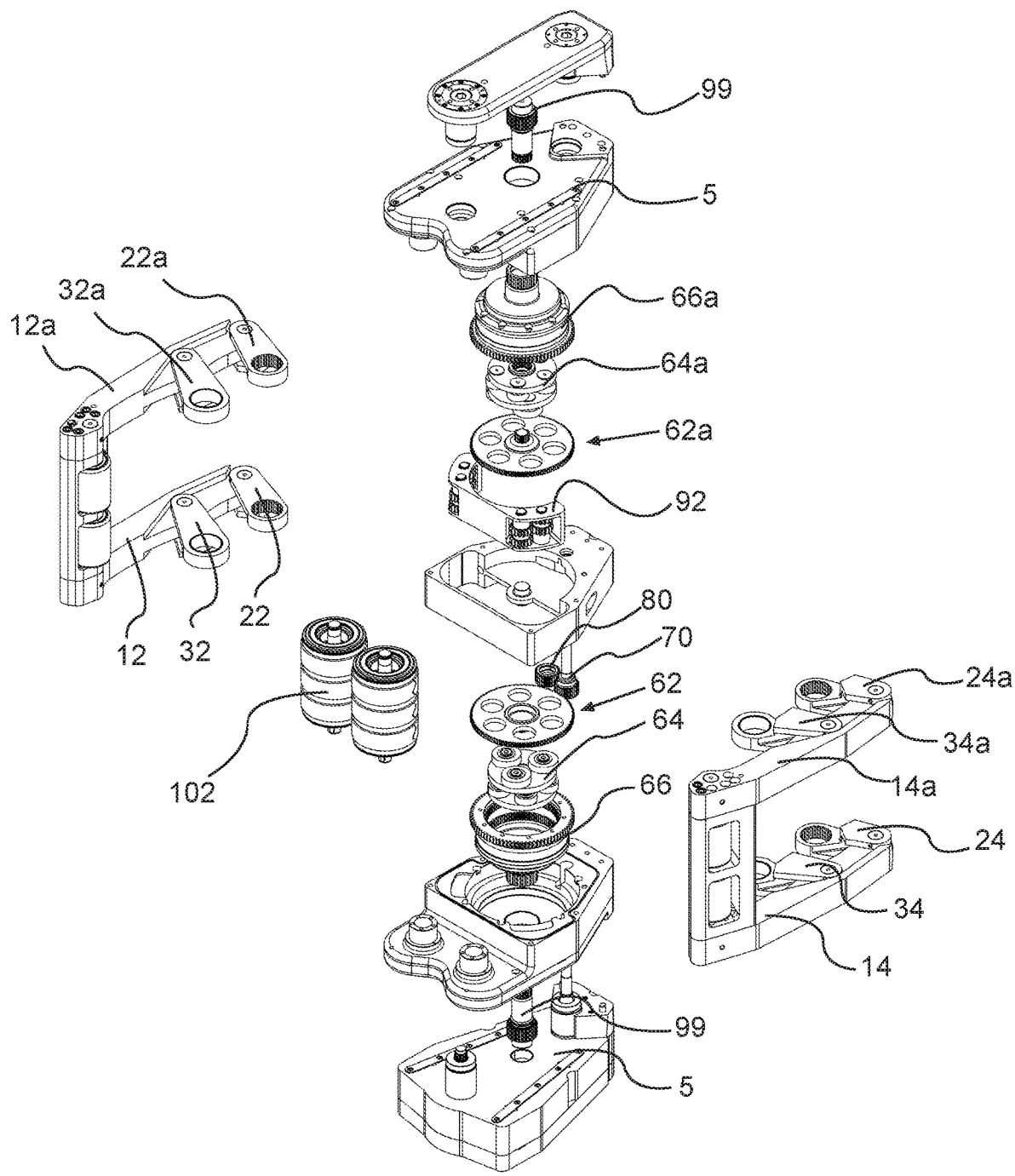
FIG. 6 discloses an exploded view of an example of an embodiment of the drive mechanism of the gripper device in FIG. 4.

FIG. 6 discloses an exploded view of an example of an embodiment of the drive mechanism 50 of the gripper device 1 in FIG. 4.

With reference to FIG. 4, the support structure 5 is extending into said opening 16 between the gripper arms 12, 14, 12a, 14a, and the support structure 5 comprises the abutment element 18 arranged in the opening 16 between the gripper arms 12, 14, 12a, 14a so that the pipe abuts with the abutment element 18 when the gripper arms 12, 14, 12a, 14a are in the engaged state.

In the disclosed embodiment of the present disclosure, the gripper device 1 further comprises a rotation device 100 arranged on the abutment element 18. The rotation device 100 is adapted act on the pipe with a force that sets the pipe into rotation when the gripper arms 12, 14, 12a, 14a are in the engaged state.

The rotation device 100 comprises one or more drive rollers 102 adapted to contact the pipe when the gripper arms 12, 14, 12a, 14a are in the engaged state. In the disclosed embodiment, the rotation device 100 comprises two drive rollers 102 for rotating the pipe. However, it shall be understood that a single drive roller 102 or any other plurality of drive rollers 102 may be used for setting the pipe in rotation. Preferably, the gripper device 1 comprises a further drive unit and a further drive transmission for transmitting power from the further drive unit to the one or more drive rollers 102 of the rotation device 100. The further drive unit and a further drive transmission are not disclosed in the figures.

In the discloses embodiment of the present disclosure, the gripper device 1 further comprises a further rotation device 110 comprising one or more passive rollers 112 at end portion of the gripper arms 12, 14, 12a, 14a. The passive rollers 112 are adapted to support the rotation of the pipe. In the disclosed embodiment, the further rotation device 110 comprises four passive rollers 112. However, it shall be understood that any other number of passive rollers 112 may be used to support the rotation of the pipe.

It should be noted that the above-mentioned embodiments illustrate rather than limit the invention that is claimed below, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A gripper device for gripping a pipe, the gripper device comprising:
   a support structure;
   a gripper arm arrangement comprising a first gripper arm and a second gripper arm and comprising an open state which enables the pipe to be introduced into an opening between the first gripper arm and the second gripper arm and an engaged state in which an end portion of the first gripper arm and an end portion of the second gripper arm are adapted to engage with the pipe;
   a drive arm arrangement comprising a first drive arm movably connecting the first gripper arm to the support structure and a second drive arm movably connecting the second gripper arm to the support structure,
   a pivot arrangement comprising a first pivot rotationally connecting the first drive arm to the support structure and a second pivot rotationally connecting the second drive arm to the support structure; and
   a drive mechanism comprising a transmission drive shaft and a transmission arrangement comprising a first transmission member, a second transmission member, and a third transmission member;
   wherein the first transmission member, the second transmission member, and the third transmission member are each rotatable with respect to each other and coupled directly or indirectly with each other; and wherein the first transmission member is coupled with the drive shaft, the second transmission member is coupled to the first transmission member, and the third transmission member is coupled with the second transmission member;

wherein the second transmission member is coupled to the first drive arm;

wherein the third transmission member is coupled to the second drive arm; and wherein the first transmission member, the second transmission member, and the third transmission member are coaxially arranged.

2. The gripper device according to claim 1, wherein the transmission arrangement is any of a planetary gear, a harmonic gear, a cycloidal gear or a gear where the drive shaft and an output shaft are located on a common rotational axis.

3. The gripper device according to claim 1, wherein the transmission arrangement comprises a planetary gear, wherein the first transmission member constitutes a sun gear, the second transmission member constitutes two or more planetary gears, and the third transmission member constitutes an annular gear.

4. The gripper device according to claim 3, wherein the first pinion is directly engaging with the sun gear of the transmission member and the second pinion.

5. The gripper device according to claim 3, wherein the transmission arrangement comprises a first stage gearing and a second stage gearing.

6. The gripper device according to claim 5, wherein the first stage gearing comprises a first stage sun gear, a first stage planetary gears, a first stage annular gear, and wherein the second stage gearing comprises a second stage sun gear, a second stage planetary gears and second stage annular gear.

7. The gripper device according to claim 1, wherein the support structure is extending into said opening between the first gripper arm and the second gripper arm, and wherein the gripper device further comprises a link arm arrangement comprising a first link arm and a second link arm arranged rotationally connected between the support structure and the respective first gripper arm and second gripper arm in said opening between the first gripper arm and the second gripper arm.

8. The gripper device according to claim 7, wherein the first link arm and the second link arm comprise a respective fifth pivot between the first link arm and the second link arm and the support structure, and a respective sixth pivot between the first link arm and the first gripper arm and between the second link arm and the second gripper arm.

9. The gripper device according to claim 1, wherein the drive mechanism comprises a drive unit and a drive train for transmitting power from drive unit to the transmission drive shaft.

10. The gripper device according to claim 9, wherein the drive unit is an electric motor.

11. The gripper device according to claim 1, wherein the support structure is extending into said opening between the first gripper arm and the second gripper arm and wherein the support structure comprises an abutment element arranged in the opening between the first gripper arm and the second gripper arm and configured such that the pipe abuts with the abutment element when the first gripper arm and the second gripper arm are in the engaged state.

12. The gripper device according to claim 11, wherein the gripper device further comprises a rotation device adapted to act on the pipe with a force that sets the pipe into rotation when the first gripper arm and the second gripper arm are in the engaged state.

13. The gripper device according to claim 12, wherein the rotation device is arranged on the abutment element.

14. The gripper device according to claim 12, wherein the rotation device comprises one or more drive rollers adapted to contact the pipe when the first gripper arm and the second gripper arm are in the engaged state.

15. The gripper device according to claim 14, wherein the gripper device comprises a further drive unit and a further drive transmission for transmitting power from the further drive unit to said one or more drive rollers.

16. The gripper device according to claim 1, further comprising a further rotation device (110) arranged at an end portion of at least one of the first gripper arm and the second gripper arm and configured to support the rotation of the pipe when the first gripper arm and the second gripper arm are in the engaged state.

17. The gripper device according to claim 16, wherein the further rotation device comprises one or more passive rollers configured to contact the pipe when the first gripper arm and the second gripper arm are in the engaged state.

18. A gripper device for griping a pipe, the gripper device comprising:

a support structure;

a gripper arm arrangement comprising a first gripper arm and a second gripper arm and comprising an open state which enables the pipe to be introduced into an opening between the first gripper arm and the second gripper arm and an engaged state in which an end portion of the first gripper arm and an end portion of the second gripper arm are adapted to engage with the pipe;

a drive arm arrangement comprising a first drive arm movably connecting the first gripper arm to the support structure and a second drive arm movably connecting the second gripper arm to the support structure, a pivot arrangement comprising a first pivot rotationally connecting the first drive arm to the support structure and a second pivot rotationally connecting the second drive arm to the support structure; and a drive mechanism comprising a transmission drive shaft and a transmission arrangement comprising a first transmission member, a second transmission member, and a third transmission member;

wherein the first transmission member, the second transmission member, and the third transmission member are each rotatable with respect to each other and coupled directly or indirectly with each other;

wherein the first transmission member is coupled with the drive shaft, the second transmission member is coupled to the first transmission member, and the third transmission member is coupled with the second transmission member;

wherein the second transmission member is coupled to the first drive arm;

wherein the third transmission member is coupled to the second drive arm;

a further gripper arm arrangement comprising a third gripper arm and a fourth gripper arm comprising an open state which enables the pipe to be introduced into an opening between the third gripper arm and the fourth gripper arm and an engaged state in which an end portion of the third gripper arm and an end portion of the fourth gripper arm are adapted to engage with the pipe;

a further drive arm arrangement comprising a third drive arm movably connecting the third gripper arm to the support structure and a fourth drive arm movably connecting the fourth gripper arm to the support structure;

a further pivot arrangement comprising a third pivot (42a) rotationally connecting the third drive arm to the support structure and a fourth pivot rotationally connecting the fourth drive arm to the support structure, and wherein the drive mechanism further comprises:

a further transmission arrangement comprising a further first transmission member, a further second transmission member, and a further third transmission member, each rotatable in respect to each other and coupled directly or indirectly with each other;

wherein the further first transmission member is coupled with the drive shaft, the further second transmission member is coupled to the further first transmission member, and the further third transmission member is coupled with the further second transmission member; and wherein the further second transmission member is coupled to the fourth drive arm and the further third transmission member is coupled to the third drive arm.

19. The gripper device according to claim 18, wherein the further first transmission member, the further second transmission member, and the further third transmission member are coaxially arranged.

20. The gripper device according to claim 18, wherein the further second transmission member and the further third transmission member are configured rotatable in opposite directions in respect to each other.

21. The gripper device according to claim 18, wherein the drive mechanism further comprises a first pinion and a second pinion, wherein the first pinion is coupled to the transmission drive shaft, the first transmission member and the second pinion, and wherein the second pinion is coupled to the further first transmission member.

22. The gripper device according to claim 18, wherein the first drive arm and the third drive arm are parallel spaced apart with respect to a rotation axis of the pivot arrangement, and wherein the second drive arm and the fourth drive arm are parallel spaced apart with respect to said rotation axis of the pivot arrangement.

23. The gripper device according to claim 18, wherein the device comprises a respective connection element between the first gripper arm and the third gripper arm, and between the second gripper arm and the fourth gripper arm.

24. The gripper device according to claim 18, wherein the further transmission arrangement is any of a planetary gear, a harmonic gear, a cycloidal gear or a gear where the drive shaft and an output shaft are located on a common rotational axis.

25. The gripper device according to claim 18, wherein the further transmission arrangement comprises a planetary gear, wherein the further first transmission member constitutes a sun gear, the further second transmission member constitutes two or more planetary gears, and the further third transmission member constitutes an annular gear.

26. The gripper device according to claim 18, wherein the further transmission arrangement comprises a first stage gearing and a second stage gearing.

27. The gripper device according to claim 18, wherein the gripper device further comprises an adjustable synchronization gearing acting on the transmission arrangement and the further transmission arrangement.

28. The gripper device according to claim 27, wherein the synchronization gearing is acting on the third transmission member of the transmission arrangement and the further third transmission member of the further transmission arrangement.

29. The gripper device according to claim 27, wherein the synchronization gearing comprises a synchronization carrier configured to allow movement of the synchronization carrier around a planet gear axis in dependency of a position of the first gripper arm, the second gripper arm, the third gripper arm, and the fourth gripper arm.

30. The gripper device according to claim 29, wherein the synchronization gearing comprises adjustment means for adjusting the allowed movement of the synchronization carrier.

31. A gripper device for gripping a pipe, the gripper device comprising:

a support structure;

a gripper arm arrangement comprising a first gripper arm and a second gripper arm and comprising an open state which enables the pipe to be introduced into an opening between the first gripper arm and the second gripper arm and an engaged state in which an end portion of the first gripper arm and an end portion of the second gripper arm are adapted to engage with the pipe;

a drive arm arrangement comprising a first drive arm movably connecting the first gripper arm to the support structure and a second drive arm movably connecting the second gripper arm to the support structure, a pivot arrangement comprising a first pivot rotationally connecting the first drive arm to the support structure and a second pivot rotationally connecting the second drive arm to the support structure; and a drive mechanism comprising a transmission drive shaft and a transmission arrangement comprising a first transmission member, a second transmission member, and a third transmission member;

wherein the first transmission member, the second transmission member, and the third transmission member are each rotatable with respect to each other and coupled directly or indirectly with each other;

wherein the first transmission member is coupled with the drive shaft, the second transmission member is coupled to the first transmission member, and the third transmission member is coupled with the second transmission member;

wherein the second transmission member is coupled to the first drive arm;

wherein the third transmission member is coupled to the second drive arm; and wherein the second transmission member and the third transmission member are configured to rotate in opposite directions in respect to each other.

* * * * *

UNITED STATES PATENT AND TRADEMARK OFFICE
CERTIFICATE OF CORRECTION

| | | |
|---|---|---|
| PATENT NO. | : 10,774,601 B2 | Page 1 of 1 |
| APPLICATION NO. | : 16/318479 | |
| DATED | : September 15, 2020 | |
| INVENTOR(S) | : Svein Søyland | |

It is certified that error appears in the above-identified patent and that said Letters Patent is hereby corrected as shown below:

In the Claims

Column 14, Line 25, please delete "for griping a", and insert --for gripping a--

Signed and Sealed this
Eleventh Day of October, 2022

Katherine Kelly Vidal
*Director of the United States Patent and Trademark Office*